United States Patent [19]

Neder et al.

[11] 4,026,610

[45] May 31, 1977

[54] ROLLING CONTACT BEARING SYSTEM

[75] Inventors: Günter Neder; Armin Olschewski, both of Schweinfurt, Germany

[73] Assignee: SKF Industrial Trading and Development Company, B.V., Nieuwegein, Netherlands

[22] Filed: May 20, 1975

[21] Appl. No.: 579,267

[30] Foreign Application Priority Data

May 25, 1974 Germany .................... 7418153[U]

[52] U.S. Cl. .............................. 308/236; 308/187; 403/370

[51] Int. Cl.$^2$ ......................................... F16C 33/30

[58] Field of Search ............ 308/187.1, 187.2, 189, 308/236; 403/97, 368, 370

[56] References Cited

UNITED STATES PATENTS

| | | |
|---|---|---|
| 2,723,138 | 11/1955 | Knudsen ........................... 403/370 |
| 3,495,857 | 2/1970 | Hawke et al. ........................ 403/97 |
| 3,953,142 | 4/1976 | Price et al. ......................... 308/236 |
| 3,957,385 | 5/1976 | Ullberg ............................... 403/370 |

*Primary Examiner*—Joseph F. Peters, Jr.
*Assistant Examiner*—Richard A. Bertsch
*Attorney, Agent, or Firm*—Daniel M. Rosen

[57] ABSTRACT

A bearing assembly having a rolling contact bearing with an outer race extending to and affixed to a housing, and an inner race having axially extending teeth on its end faces. A driving member engages one end face, a driven member engages the other end face, and a through-bolt extends through the inner bore of the inner race for clamping the driven member, inner race and driving member together. An auxiliary assembly sleeve is connected to one of the driving or driven members and fitted over the through-bolt, the sleeve being in friction-tight engagement with the inner bore of the inner race.

12 Claims, 3 Drawing Figures

ROLLING CONTACT BEARING SYSTEM

THE INVENTION

The invention relates to rolling contact bearing systems, and more in particular to an arrangement for the floating support of drums for washing machines or the like by means of a rolling contact bearing such as a two-row rolling bearing whose inner race, designed to be longer than the outer race, has face serrations on each end face for the purpose of positive mounting, by means of a through-bolt, to the drum and pulley flanges provided with corresponding face serrations. It will be apparent of course that the bearing system may be employed in other applications.

A drum bearing of this design is disclosed in German Utility Model Pat. No. 7,205,917. The bearing unit illustrated in FIG. 4 of this utility model patent requires, especially in axial direction, little space, and the unit can be readily mounted and dismantled. As a result of the face serration on both end faces of the inner race, a satisfactory positive connection is ensured by means of a through-bolt, for the purpose of transfer of the torque from the belt pulley via the inner race of the bearing to the drum of the washing machine. It is also easy to upwardly dismantle the drum, if need be, without any axial displacement of the bearing through untightening of the through-bolt tightening means.

A prerequisite for the satisfactory operation of the above bearing arrangement is that, upon installation, the face serrations must necessarily mate with one another. Improper mating of the teeth — spur upon spur — renders the machine inoperative. A fact that renders assembly even more difficult is that the face serration molded out of solid material has relatively dull tooth tips. A visual alignment of the components is impossible because an assembler, as a result of the inaccessible location of the installation in the machinery, has no control over it.

The object of the invention is to provide an improved bearing unit for drums of washing machines or the like, whereby, upon assembly, an exact mating of the face serration at either side of the inner race is always insured.

In an arrangement of the type described above, this object is attained in accordance with the invention by providing an auxiliary assembly sleeve connected to the flange of the pulley and mounted on the through-bolt, so that, during assembly of the screw connection in the borehole of the inner race, the sleeve is forced in friction-tight engagement in the inner race.

The auxiliary assembly sleeve is preferably made of an elastic material, for instance plastic, and is pushed during assembly into the inner race, causing the inner race to rotate then likewise as a result of the rotation of the through-bolt. As a result the face serrations of the inner race rotate to mate with the face serrations of the flange of the drum and the pulley and bring about an exact mating.

If the flange of the drum is not provided with a threaded borehole for the through-bolt, according to another embodiment of the invention, in order to assist the auxiliary assembly sleeve in causing the face serrations to mate, a nut is loosely inserted into the borehole of the flange of the drum and engaging the borehole of the inner race, so that the nut engages the threads on the end of the through-bolt. An elastic ring is assembled on the nut for providing a space with respect to the flange during the screwing-in process.

Additional characteristics and advantages of the invention will be apparent from the following disclosure of two exemplified embodiments illustrated in the drawings, wherein.

Figure 1:
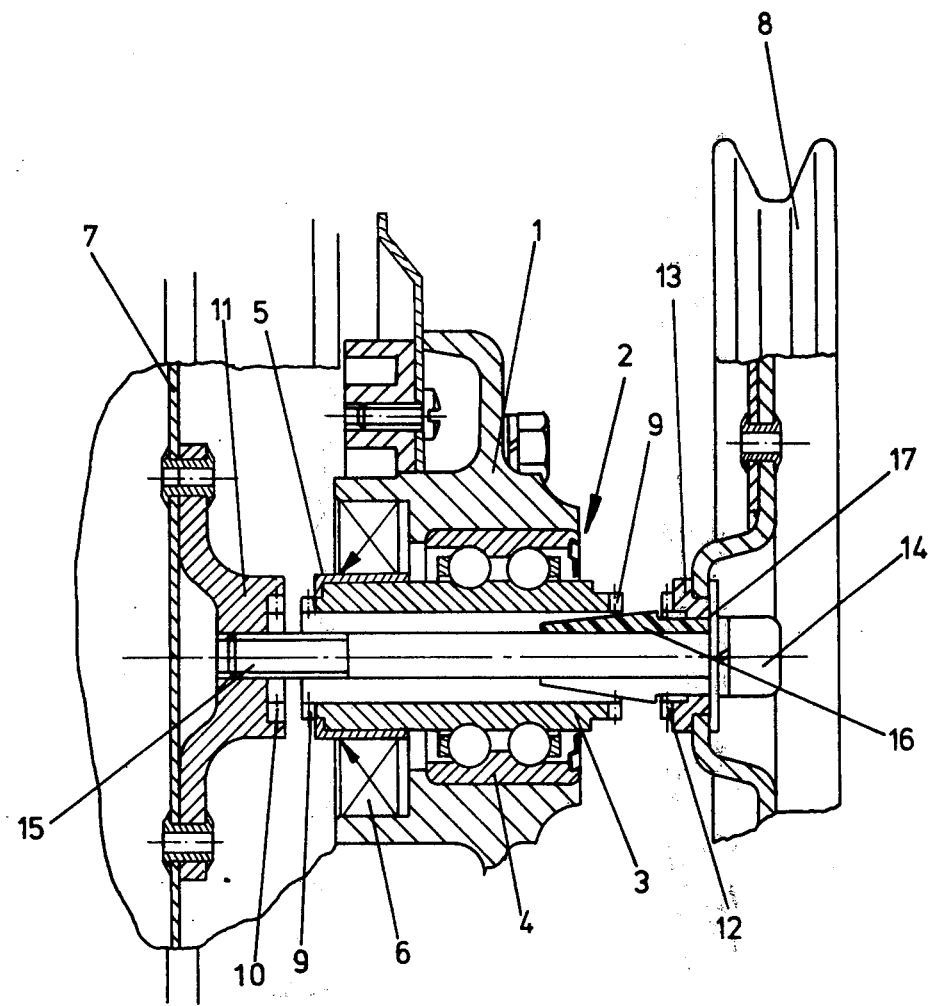
FIG. 1 is a cross-section through an arrangment of the bearing in accordance with the invention, during its assembly.
Figure 2:
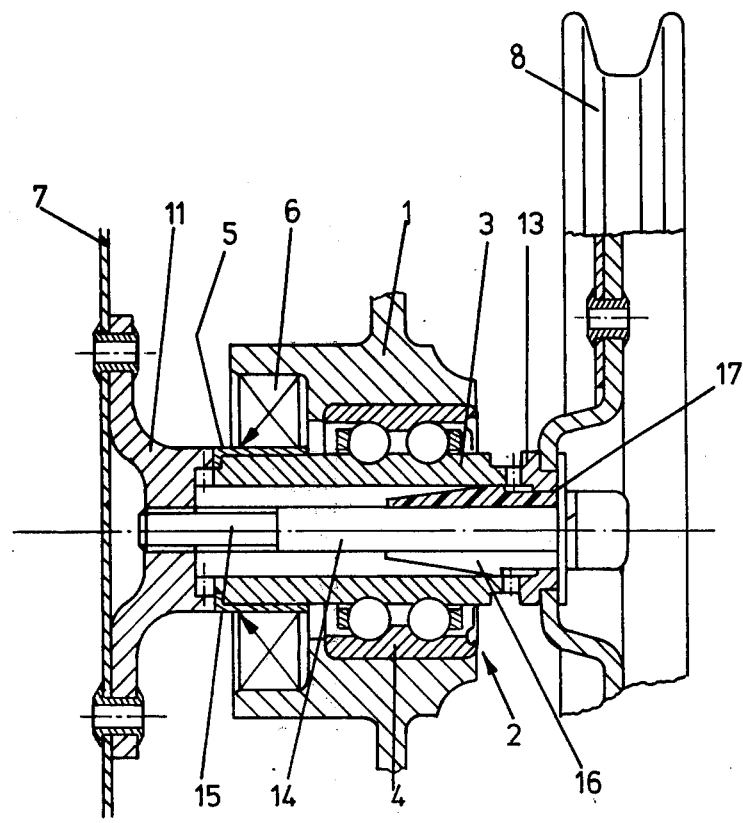
FIG. 2 is a cross-section through the bearing arrangement illustrated in FIG. 1, following its assembly.

It is apparent from FIGS. 1 and 2 that a rolling contact bearing such as a two-row bearing 2 is arranged in the housing 1 of a washing machine. The bearing, in addition to absorbing radial and axial forces, can also absorb torque stresses. The inner race 3 of the bearing 2 is substantially longer than the outer race 4 so that it can offer, in addition to a collar bearing surface 5 for a gasket 6, also the room required for the attachment of the drum 7 and the pulley 8. For that purpose, the inner race 3 is provided on either end with face serrations 9. The serrations engage, in the assembled state, on the one hand, the face serrations 10 of the flange 11 mounted to the drum 7 and, on the other, the face serrations 12 of the flange 13 connected with the pulley 8. The assembling of the individual components is effected by a through-bolt 14 traversing the inner space 3. The threaded end 15 of the bolt is screwed into the threaded borehole of the flange 11.

An auxiliary assembly sleeve 16 connected with the flange 13 of the pulley 8 is mounted on the through-bolt 14. Sleeve 16 consists of elastic material, for instance plastic, and is conically tapered at its outside circumference in the direction of the drum 7. In lieu of that arrangement, it is also permissible to provide a spherical or other shape design that insures a ready insertion of the auxiliary assembly sleeve 16 into the borehole of the inner race 3 and in friction-tight engagement therewith.

As can be seen in FIG. 1, the auxiliary assembly sleeve 16 causes, during assembly, the pre-centering of the flanges 11 and 13 with respect to the inner race 3. For the purpose of centering the pulley 8 and its face serration 12 on the through-bolt 14, the auxiliary assembly sleeve 16 is provided with a centering shoulder 17 engaged by the borehole of the flange 13.

Upon screwing-in of the through-bolt 14 into the flange 11, the auxiliary assembly sleeve 16, as illustrated in FIG. 1, is forced into the borehole of the inner race 3. The resultant friction-tight engagement between the auxiliary assembly sleeve 16 and the inner race 3 causes the inner race to rotate via the through-bolt 14 until, upon further advance, the teeth of the face serrations engage and will mate precisely.

For the purpose of compensating for substantial differences in the tolerances of the unmachined borehole of the inner race 3, the auxiliary assembly sleeve 16 is longitudinally slotted. Its press fit serves as an additional insurance against twisting for the through-bolt 14.

Figure 3:
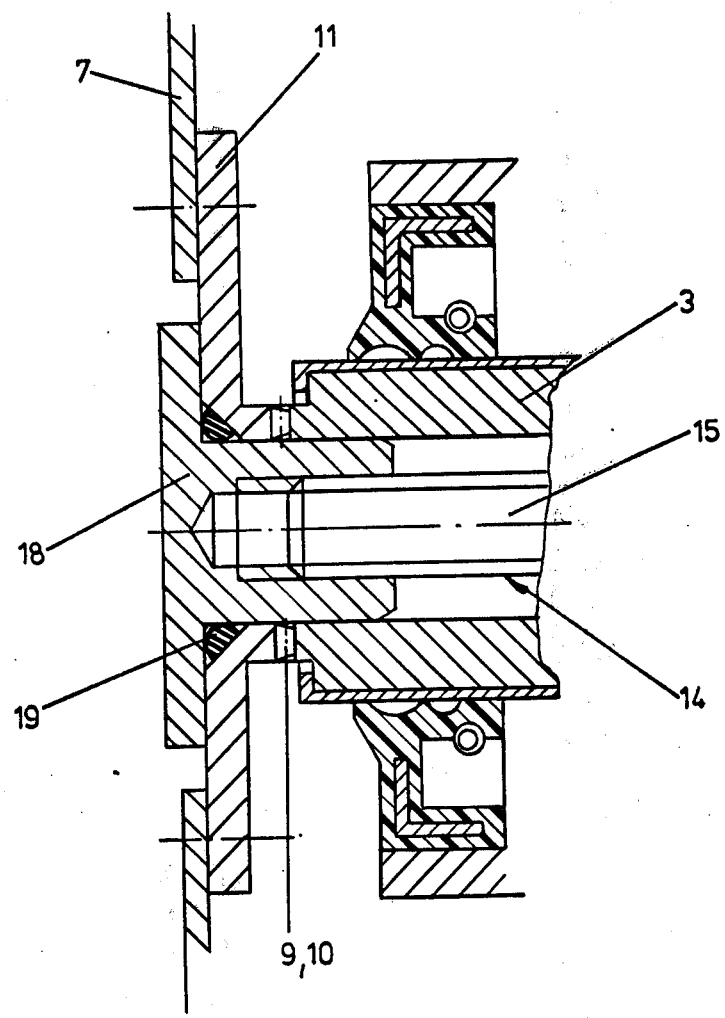
FIG. 3 is a partial cross-section through a variation of the bearing arrangement in accordance with the invention.

FIG. 3 illustrates the end, on the drum side, of a variation of the bearing arrangement in accordance with the invention. In FIG. 3, the flange 11 of the drum 7 is no provided with a screw-tapped borehole. Rather, a nut 18 is loosely fitted into the borehole of the flange 11. This nut engages the borehole of the inner race 3 and can be tightened by means of a threaded end 15 of the through-bolt 14. Onto the nut 18 there is fitted an elastic 0-ring 19. The ring 19 is sufficiently thick such that, during the screw-tightening process, there exists initially a space between the nut 18 and the flange 11. This space is reduced to zero only upon crushing of the ring 19 following the engagement of the face serrations 9 and 10.

The mode of operation of the design of FIG. 3, once assembled, is substantially identical to that of the one illustrated in FIGS. 1 and 2. Its advantage resides in the fact that the reliability of the exact engagement of the gear coupling is even enhanced in view of the fact that, upon screwing-in of the through-bolt 14, the nut 18 is capable of rotating with respect to the flange 11. This bearing arrangement is particularly advantageous if the face serration 10 is very soft. The risk of deforming the flanks of the teeth, in the event they should not initially mate exactly, is thereby prevented.

While the invention has been disclosed with reference to a limited number of embodiments, it will be apparent that variations and modifications may be made therein, and it is intended in the following claims to cover each such variation and modification as falls within the true spirit and scope of the invention.

What is claimed is:

1. In a bearing assembly wherein a rolling contact bearing has an outer race extending to and affixed to a housing, and an inner race having axially extending teeth on its end faces, a driving member engaging one said end face, a driven member engaging the other said end face, and a through-bolt extending through the inner bore of said inner race for clamping said driven member, inner race and driving member together, whereby torque is transmitted from said driving member to said driven member by way of said inner race and the teeth on the end faces thereof; the improvement comprising an auxiliary assembly sleeve engaging one of said driving and driven members and fitted over said through-bolt for precentering said members with respect to said inner race, said sleeve being in friction-tight engagement with the inner bore of said inner race whereby said inner race is rotatable with said through-bolt to enable mating of said teeth on said inner race and members during assembly thereof.

2. The bearing assembly of claim 1, wherein said sleeve is longitudinally slotted.

3. The assembly of claim 1, wherein said sleeve is externally tapered, having a smaller diameter at the end thereof away from said one member.

4. The bearing assembly of claim 1, wherein said auxiliary assembly sleeve is comprised of an elastic material, whereby said torque is transmitted substantially solely by way of said teeth and inner race.

5. The bearing assembly of claim 4, wherein said sleeve is of a plastic material.

6. The bearing assembly of claim 1, further comprising a nut extending loosely through the other of said members and having an external surface engaging the inner bore of said inner race, said through-bolt extending from said one member through said inner bore and threadingly engaging said nut.

7. The bearing assembly of claim 6 further comprising an elastic ring positioned to space said nut from said other member, said elastic ring being positioned to be compressed to enable contact between said nut and said other member upon tightening of said bolt in said nut.

8. The bearing assembly of claim 7, wherein said nut has a rearly outwardly extending flange positioned to engage the surface of said other member away from said inner race, said other member having a hole through which said nut extends and a chamfer on the edge of said hole facing said flange of said nut, said elastic ring being positioned to surround said nut in said chamfer.

9. The bearing assembly of claim 1, wherein said rolling contact bearing is a two-row rolling bearing.

10. The bearing assembly of claim 1, wherein said driving member comprises a pulley and said driven member comprises a drum.

11. In a method for assembling a bearing assembly wherein a rolling contact bearing has an outer race extending to and affixed to a housing, and an inner race having axially extending teeth on its end face, a driving member engaging one said end face, a driven member engaging the other said end face, and a through-bolt extending through the inner bore of said inner race for clamping said driven member, inner race and driving member together, the improvement comprising inserting said through-bolt in an auxiliary assembly sleeve prior to insertion thereof through said inner race, so that said auxiliary assembly sleeve engages the inner bore of the inner race in a friction-tight manner, rotating said through-bolt whereby the friction-tight engagement between said sleeve and inner race effects rotation of said inner race to align the teeth on at least one of the end faces of said inner race with the teeth on the corresponding member, and then tightening said through-bolt to positively engage the teeth on the end faces of said inner race with the teeth on both of said members for transition of torque between said driving member and driven member.

12. The method of claim 11 wherein said step of inserting said through-bolt into an auxiliary assembly sleeve comprises inserting said through-bolt in an elastic auxiliary assembly sleeve.

* * * * *

UNITED STATES PATENT AND TRADEMARK OFFICE
CERTIFICATE OF CORRECTION

PATENT NO. : 4,026,610
DATED : May 31, 1977
INVENTOR(S) : Gunter Neder et al

It is certified that error appears in the above–identified patent and that said Letters Patent are hereby corrected as shown below:

Column 2, line 67, change "no" to --not--.

Signed and Sealed this sixteenth Day of August 1977

[SEAL]

Attest:

RUTH C. MASON
*Attesting Officer*

C. MARSHALL DANN
*Commissioner of Patents and Trademarks*